P. BRÜHL.
BALL BEARING.
APPLICATION FILED JULY 10, 1912.
1,071,295. Patented Aug. 26, 1913.
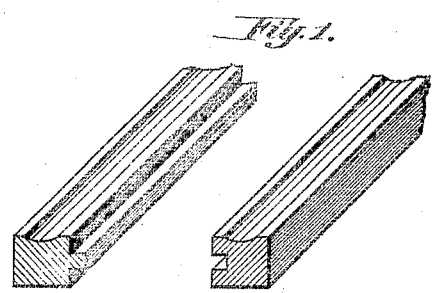
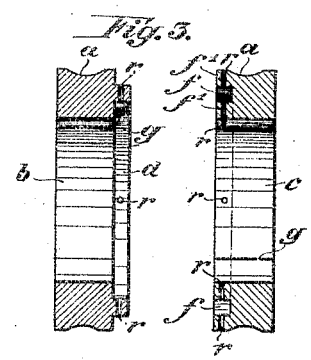
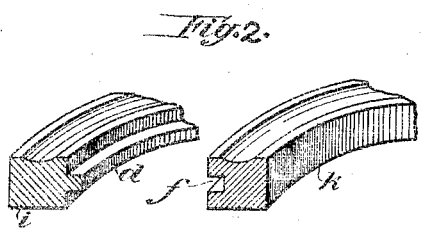
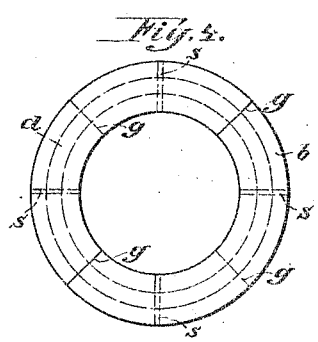
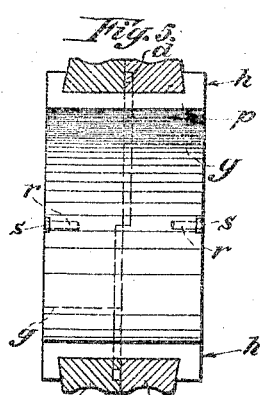
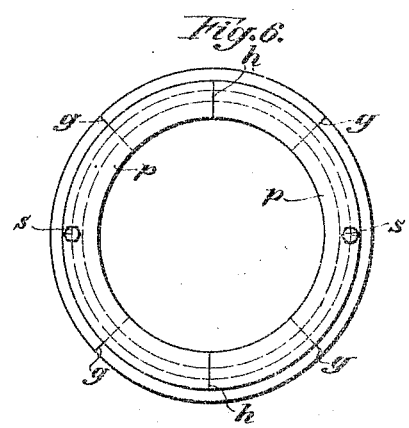
Witnesses: Inventor:
Paul Brühl

UNITED STATES PATENT OFFICE.

PAUL BRÜHL, OF DUSSELDORF, GERMANY.

BALL-BEARING.

1,071,295.

Specification of Letters Patent. Patented Aug. 26, 1913.

Application filed July 10, 1912. Serial No. 708,635.

*To all whom it may concern:*

Be it known that I, PAUL BRÜHL, engineer, a subject of the German Emperor, residing at Dusseldorf, Rhenish Prussia, in the Empire of Germany, have invented certain new and useful Improvements in Ball-Bearings, of which the following is a specification.

My invention relates to ball-bearings with two or more pairs of radially divided ball-race rings and consists in the particular construction of the ball-race rings with the object of preventing their relative displacement. According to my invention the rings are provided with annular projections and recesses adapted to engage either each other or corresponding recesses and projections of a connection member, this being accomplished with or without the additional use of reciprocal clamping action. This method of construction contemplates manufacture of the rings, in quantity, by bending the rings from straight bars. In dealing with particularly powerful stresses which might have a special tendency to cause relative displacement of the ball-race rings, a further safeguard is provided by having interengaging parts of adjoining ball-race rings connected by pins, bolts or the like, in a manner which permits them to be readily detachable.

In the drawings:—Figures 1 and 2 show the separate parts of ball-race bars before and after bending, Fig. 3 two complementary inner ball race rings in section, Fig. 4 is a side elevation of such a ball-bearing. Figs. 5 and 6 show a modified form of ball bearing in section and in side elevation, respectively.

As has already been mentioned the ball-race sections are suitably produced by bending straight bars, which as is shown in Figs. 1 and 2 are laterally provided with a groove and feather. In the bearing according to Figs. 3 and 4 the bars have been bent so that the two inner ball-race rings $b$ and $c$ are in two sections, the race grooves $a$ being placed on the periphery. In this case the race rings $b$ and $c$ are provided on their facing sides with an annular feather $d$, and groove $f$ respectively. In joining the two rings $b$ and $c$ the feather $d$ engages the groove $f$ and owing to suitable formation is fixed so that relative displacement of the ball-rings is prevented. In joining the rings $b$ and $c$, care should be taken that the joints $g$ of the several ring segments are broken in known manner, in such a way as may, for example, be seen in Fig. 4. If the bars represented in Fig. 1 are bent in the manner shown in Fig. 2, ball-rings in the form used for thrust bearings are produced. The ring $i$ is provided with an annular feather $d$ which engages the annular groove $f$ of ring $k$. Obviously also in this case the joints of the races are broken when the several ring-segments are united.

It is not necessary that the feather and groove of the interengaging ring shall form an uninterrupted annulus, as they may be interrupted in parts, preferably, however, in such a way that the groove of one race-segment engages the feathers of two jointed ring segments of the adjoining ring, in which case feather and groove will have to be arranged alternately on each of the rings. In this way each segment of a race ring holds two segments of the adjoining ring together.

A modified form of the ball bearing is illustrated in Figs. 5 and 6 in section and in side elevation respectively. The rings $b$ and $c$ are made in two or more segments and are held by an annular casing $p$ which is divided axially into two semi-circular parts. The outside faces of the rings are beveled in order that they may not be withdrawn radially from dove-tailed grooves in the casing $p$. In order to unite the parts $b$, $c$ and $p$ two halves of the rings are inserted into each half of the casing, when the two latter are placed face to face and the segments of the rings slid along over the now completed circumference of the casing in such a way that the joints $g$ of the rings are broken not only in relation to each other but also in relation to the joints $h$ of the casing $p$. Thus, a rigid connection is established without the employment of any other means.

If, with any of the constructions shown in the drawings circumstances should arise, which would make relative displacement of the adjoining rings appear possible, further security in addition to that obtained by clamping the rings one into the other by means of feather and groove, may be provided by connecting the inter-engaging parts of adjoining rings by means introduced from the outside, for example by means of pins, screws or the like. Such a safeguard is indicated in Figs. 3 and 4.

Both the feather $d$ and the rims $f^1$ bordering the groove $f$ are provided with radial bores $r$ which in uniting the rings $b$ and $c$ are placed in continuity so that, as shown in Fig. 4, pins $s$ may be inserted in the said bores.

It is immaterial to the subject of this invention whether the rings be subdivided into two or into more segments. For very large sized ball-bearings it may be advantageous to make the rings of a great number of parts. The consumption of material, which, having regard to the cost price, has hitherto put a limit to the size of ball-bearings no longer needs consideration, because according to this invention the several segments of the ball-rings are bent from straight material and can easily be worked by means of suitable devices.

This invention may be used with particular advantage in cases where it is difficult or altogether impossible to push the ball bearing on to the shaft, as for example with long axles, cranked or bent shafts, crank gear and the like. As compared with other ball bearings the subject of the invention possesses the advantage of cheapness. Besides the already mentioned economy in material and labor there is the further fact that part of the stationary ball race structure, which is not under pressure but merely serves to reconvey the balls to the pressure surface may be made of a cheaper metal than hitherto.

Having now particularly described and ascertained the nature of my said invention and in what manner the same is to be performed I declare that what I claim is:—

1. In a ball bearing structure, the combination with a pair of rings each provided with a ball race and each composed of a plurality of segments, the segments of said rings having feather and groove connecting portions for uniting said rings, the joints of the segments of one ring being out of registry with the joints of the segments of the other ring whereby the connecting portions of a segment of one ring may be connected with a plurality of segments of the other ring, substantially as described.

2. In a ball bearing structure, the combination with a pair of rings each provided with a ball race and each composed of a plurality of segments, the segments of said rings having feather and groove connecting portions, the joints of the segments of one ring being out of registry with the joints of the segments of the other ring, whereby the feather connecting portion of a segment of one ring may be engaged with the grooves of a plurality of segments of the other ring, and radially disposed pins extending through said feather and groove portions for connecting said rings with each other, substantially as described.

In testimony whereof I affix my signature in presence of two witnesses.

PAUL BRÜHL. [L. S.]

Witnesses:
HELEN NUFER,
ALBERT NUFER.